US008307056B2

(12) United States Patent
Canali et al.

(10) Patent No.: US 8,307,056 B2
(45) Date of Patent: Nov. 6, 2012

(54) SHARED RESOURCES IN A MULTI MANAGER ENVIRONMENT

(75) Inventors: Massimo Canali, Vimercate (IT); Andrea Maria Mazzini, Pessano c/ Bornago (IT); Stefano Volonte, Monza (IT)

(73) Assignee: Alcatel Lucent, Paris (FR)

( * ) Notice: Subject to any disclaimer, the term of this patent is extended or adjusted under 35 U.S.C. 154(b) by 1287 days.

(21) Appl. No.: 11/186,995

(22) Filed: Jul. 22, 2005

(65) Prior Publication Data

US 2006/0026225 A1 Feb. 2, 2006

(30) Foreign Application Priority Data

Aug. 2, 2004 (EP) .................................... 04291977

(51) Int. Cl.
*G06F 15/16* (2006.01)
*G06F 15/173* (2006.01)

(52) U.S. Cl. ........ 709/223; 709/200; 709/218; 709/224; 709/225

(58) Field of Classification Search ................... 709/200
See application file for complete search history.

(56) References Cited

U.S. PATENT DOCUMENTS

| | | | | |
|---|---|---|---|---|
| 5,758,083 | A * | 5/1998 | Singh et al. | 709/223 |
| 2002/0184345 | A1 * | 12/2002 | Masuyama et al. | 709/220 |
| 2004/0054681 | A1 * | 3/2004 | Pitts | 707/100 |
| 2005/0091078 | A1 * | 4/2005 | Hunt et al. | 705/1 |
| 2005/0195741 | A1 * | 9/2005 | Doshi et al. | 370/230 |
| 2006/0031312 | A1 * | 2/2006 | Ellanti et al. | 709/206 |
| 2006/0036719 | A1 * | 2/2006 | Bodin et al. | 709/223 |

FOREIGN PATENT DOCUMENTS

EP 0 720 091 A 7/1996

OTHER PUBLICATIONS

ITU-T G.8080/Y.1304: "Architecture for the automatically switched optical network (ASON)" ITU-T Study Group 15, Nov. 2001, XP002311603.*

(Continued)

*Primary Examiner* — Kevin Bates
*Assistant Examiner* — Mohammed Ahmed
(74) *Attorney, Agent, or Firm* — Carmen Patti Law Group, LLC

(57) ABSTRACT

A method is described for controlling a shared resource for interconnecting two or more network domains being controlled by different Managers. Multiple Managers control the shared resource for the configuration of a segment of a connection between two different domains and the Managers cooperate in order to control dynamically the shared resource. Different network domains can be connected by a network element or by a link between different network elements belonging to the different network domains. In the first case the shared resource is a connection matrix of the network element, in the second case the shared resource includes the connection matrixes of the different network elements and the link between the network elements. A shared connection matrix includes some connection points for performing the cross-connections within the matrix: some connection points are controlled by one Manager, other connection points are controlled by another Manager and some shared connection points are controlled by both Managers. Multiple Managers control the shared resource by reading and writing information stored into a management information base, according to an explicit or implicit mode, or alternatevely by transmitting messages in the network directly between the Managers, according to a signalling protocol.

19 Claims, 8 Drawing Sheets

OTHER PUBLICATIONS

Tschammer V et al: "Cooperative Managemtn in Open Distributed Systems" Computer Communications, Elsevier Science Publishers BV, Amsterdam, NL, vol. 17, No. 10, Oct. 1, 1994, pp. 717-728, XP000575213 ISSN: 0140-3664.*

Tschammer V et al. : "Cooperative Management in Open Distributed System," Computer Communications, Elsevier Science Publishers BV, Amsterdam, NL, vol. 17, No. 10, Oct. 1, 1994, pp. 717-728, XP000575213.

ITU-T G.7713/Y.1704, "Distributed call and connection management (DCM)," ITU-T, Dec. 2001.

ITU-T G.7713.1/Y1704.1, Distributed call and connection management (DCM) based on PNNI, ITU-T, Mar. 2003.

* cited by examiner

Fig. 3 (technical problem)

Fig. 4 (technical problem)

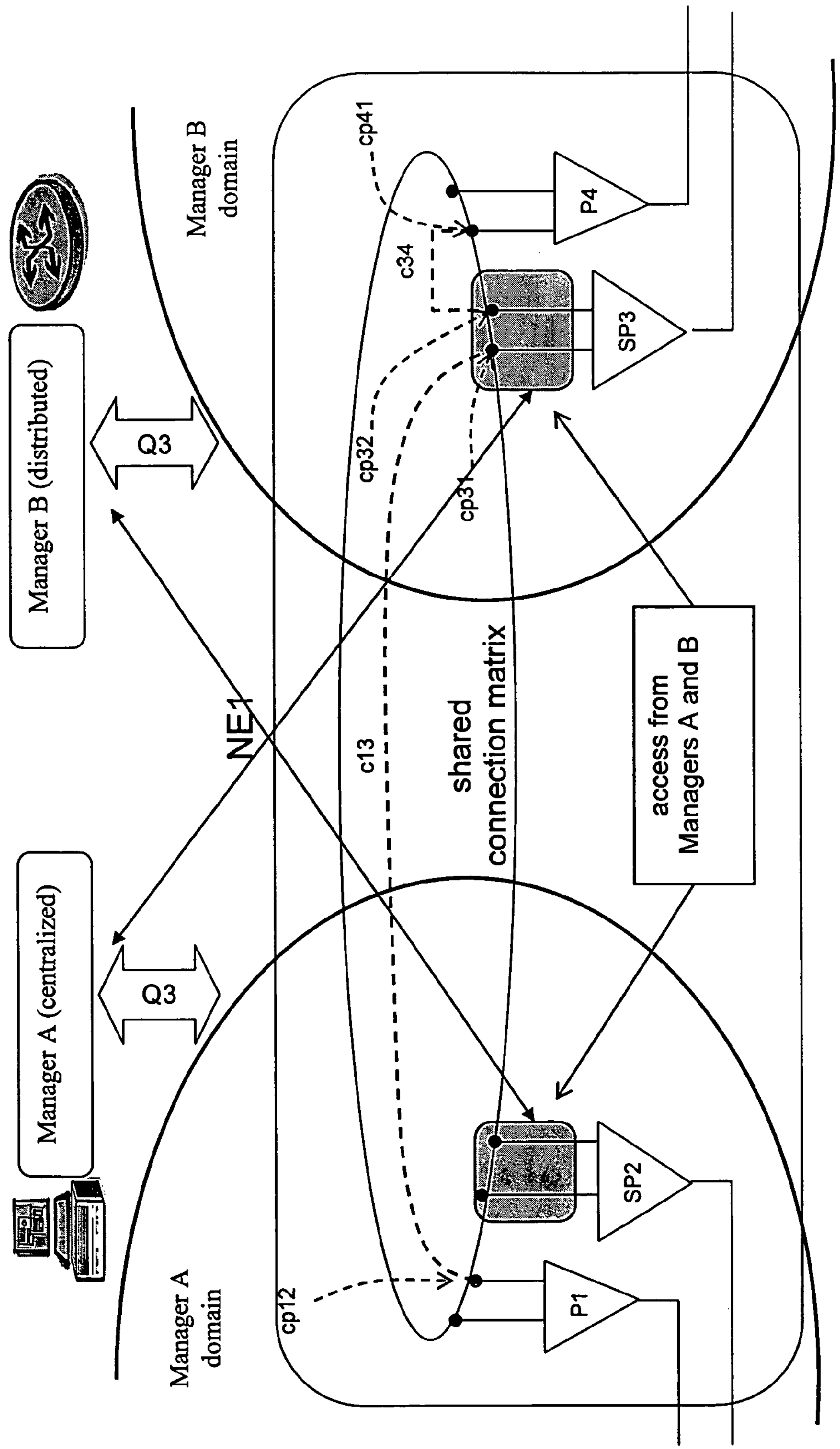
Fig. 6 (invention)

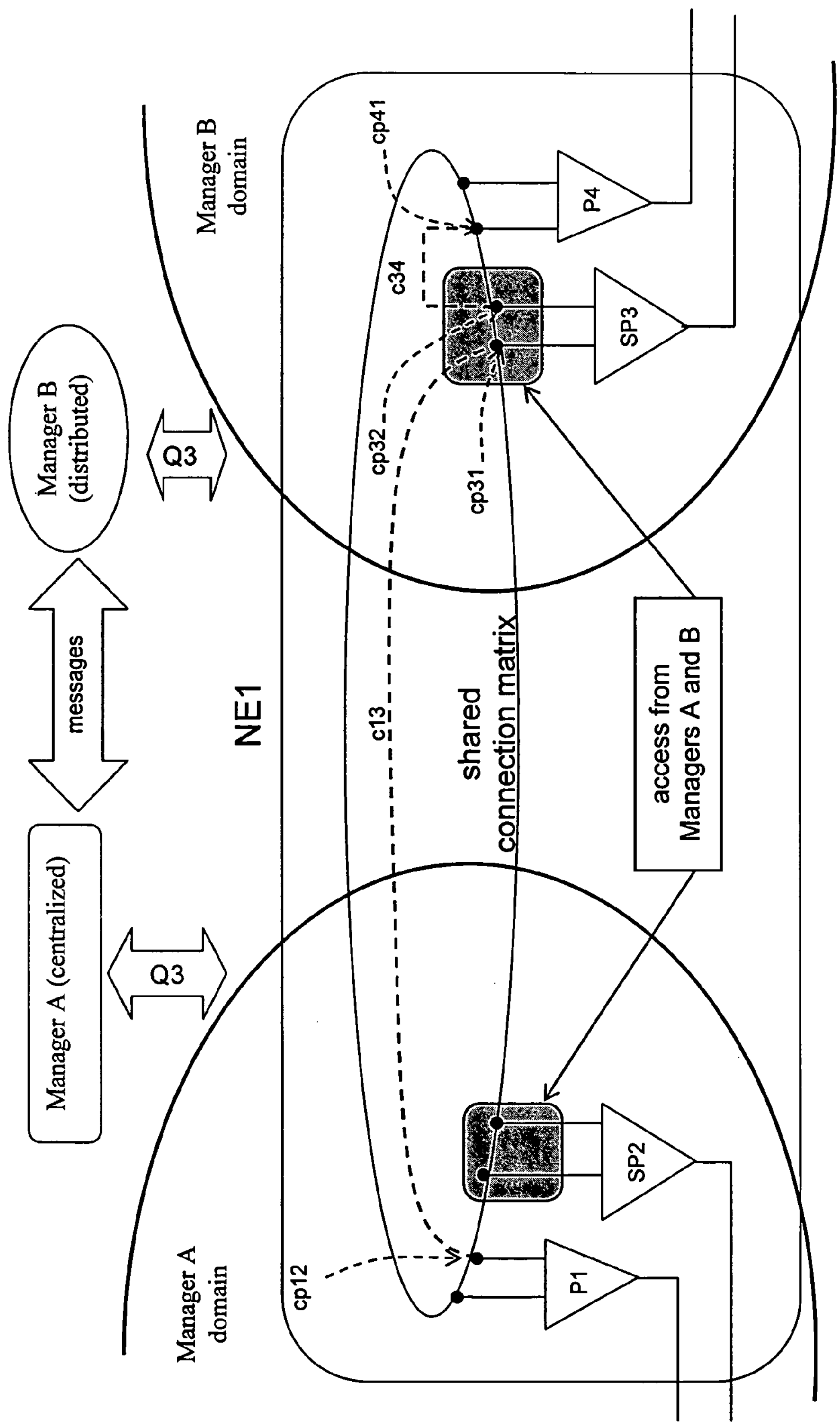
Fig. 7 (invention)

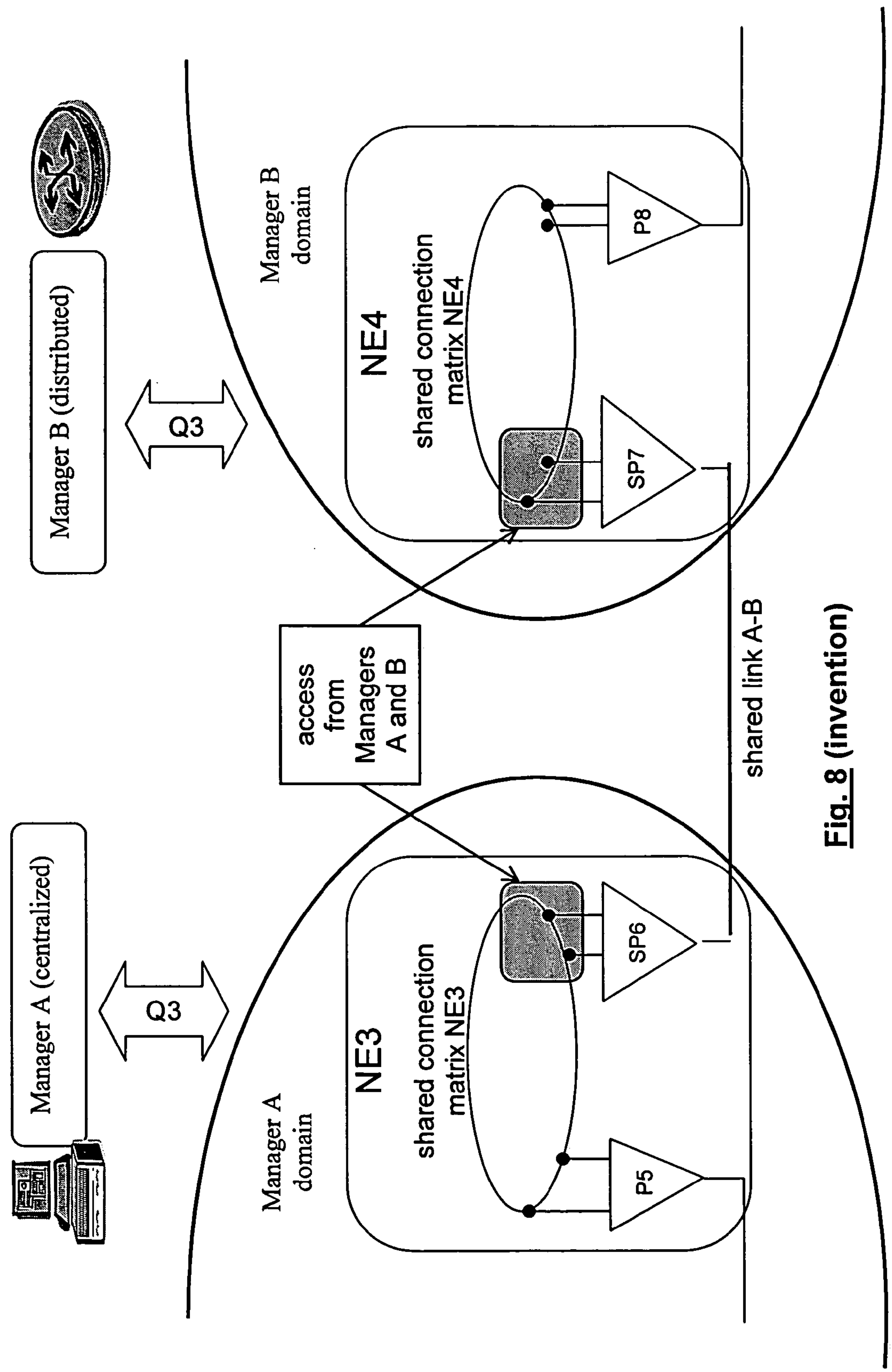
Fig. 8 (invention)

SHARED RESOURCES IN A MULTI MANAGER ENVIRONMENT

FIELD OF THE INVENTION

The present invention relates to the telecommunication field and more in particular to a telecommunication network controlled by multiple Managers. Still more in particular, the invention concerns a method for managing resources shared by the multiple Managers.

This application is based on, and claims the benefit of, European Patent Application No. 04291977.9 filed on Aug. 2, 2004, which is incorporated by reference herein.

BACKGROUND OF THE INVENTION

Traditional network architectures, defined legacy networks, are based on a centralized network Manager controlling each network element; the Manager can be connected directly to the managed network element or indirectly through channels carrying control data in the same physical network carrying user data or through a different physical network carrying only control data. The centralized Manager is a software application running on a management station and performing network management functions and it is responsible for configuration of the connections, monitoring alarms and performance of the connections, for protecting the connections providing a backup connection in case of a fault on a segment of a nominal connection. The disadvantage of this architecture is that the centralized Manager can't manage network elements of different vendors unless a previous vendor agreement on management interfaces is reached. The centralized Manager performs the management functions according to the model Manager—agent—MIB. MIB stands for Management Information Base and it is a hierarchical data structure stored into each network element or into the management station defining groups and objects in the groups, the objects including variables for managing the network element; for example, a variable stores the number of bytes received from a network interface. For a TCP/IP-based network the second version of MIB is defined in RFC2011 and RFC2012. The centralized Manager sends and receives messages to MIB of a network element according to a management protocol, like SNMP, Qx, Q3 or Qecc, for performing reading and writing operations of the variables of the MIB and consequently for reading and changing the status of the network element. The agent is a software process running on a microprocessor of each managed network element and performs the translation of messages between the Manager and MIB. The advantage of this architecture is a standard management protocol between the Manager and the agent and a standard data structure of MIB, while the Manager and the agent is specific for each network element which can belong to different vendors.

The new network architectures are based on a distributed Control Plane (CP), like defined in ITU-T G.8080/Y.1304 for the Automatically Switched Optical Network (ASON), in addition to the usual Transport Plane (composed by the network elements described above) and centralized Management Plane (MP). The Control Plane is composed by Control Plane Elements (CPEs) interconnected each other and one CPE controls one or more Transport Plane Elements (TPEs). FIGS. 1 and 2 show schematically in Manager B domain the TPEs and CPEs of the ASON architecture, wherein each TPE has a correspondent CPE. Manager A and Manager C are the MP for domain B; moreover Manager A is the centralized Manager for domain A and Manager C is the centralized Manager for domain C. In the ASON architecture a new connection can be requested by the MP (and it is defined SPC, that is Soft Permanent Connection) or by the customer (and it is defined SC, that is Switched Connection) through User Network Interface (UNI); the request is sent to the CPE of the ingress end point of the connection and the connection is set up through a signalling protocol between the CPEs. Various signalling protocols can fit the ASON architecture, like RSVP-TE (RFC3209 and ITU-T G.7713.2), CR-LDP (ITU-T G.7713.3, RFC3472), PNNI (ITU-T G.7713.1) and OSPF-TE (RFC3630). The advantage of ASON architecture is that are defined standard interfaces (between two CPEs, between a CPE and a TPE, between MP and CPE, between MP and TPE) and it is possible to manage network elements of different vendors. A further advantage is that the Control Plane is responsible to provide a fast and efficient configuration of new connections within the Transport Plane, modify the connections previously set up and perform a faster restoration function providing backup connections for protecting the nominal connections.

Network operators have already deployed network architectures with a centralized network Manager and are changing part of the network (or deploying new networks) to the ASON architecture, so that both architectures coexist. In this scenario at least one resource is shared between the centralized Manager and the Control Plane Element; the shared resource can be for example a link (i.e. an electrical cable or an optical fibre) between two network elements of two different network domains or part of the one network element between two different network domain. For one network element the shared resource is for example a matrix or one or more ports connected to the matrix. Referring as an example to FIG. 1 and FIG. 2, in FIG. 1 link A-B is shared between Manager A (central Manager for domain A and MP for domain B) and distributed Manager B (CPE for domain B), while link B-C is shared between distributed Manager B (CPE for domain B) and Manager C (central Manager for domain C and MP for domain B); in FIG. 2 network element indicated with NE1 includes a matrix shared between Manager A (central Manager for domain A and MP for domain B) and distributed Manager B. The problem of sharing resources arises not only with the introduction of the ASON architecture, but also in traditional networks, wherein a resource can be shared between two centralized Managers. Still referring to FIG. 1 and FIG. 2, in FIG. 1 link A-C is shared between centralized Manager A and centralized Manager C, while in FIG. 2 network element indicated with NE2 is shared between Centralized Manager A and Centralized Manager C and also with distributed Manager B.

Management of shared resources is required for controlling network management functions and in particular for provisioning and protecting connections between different domains crossing the shared resource; these connections are indicated with c1 and c2 in FIG. 1 and with c3 and c4 in FIG. 2. For a shared link, that is a segment of a connection, the solution can be to assign statically in advance the link to one Manager, so that only this Manager can use this link for controlling the connections. This is shown in FIG. 3, which includes more details of network elements NE3 and NE4 of FIG. 1. Each network element includes a connection matrix (connection matrix NE3, connection matrix NE4) having connection points for performing cross-connections within the matrix by connecting different connection points and includes ports (P5, P6, P7, P8) for connecting a group of connection points to a link, the link connecting different network elements. The bandwidth of the link of one port is at least the sum of the bandwidth of the connection points of the port. The port also includes means for performing management functions of the correspondent connection points, such as fault and performance monitoring. The shared resource is link A-B connecting one port of NE3 in domain A to one port of NE4 in domain B. According to this solution, link A-B is assigned for example to Manager A, which is responsible to control this link for providing connections between the two domains; this is a disadvantage because Manager B can't use this link also if it is not used by Manager A.

For a network element including a shared resource, the problem is to control the segment of the connection inside the network element crossing different domains. FIG. 4 shows more in detail network element NE1 of FIG. 2 including some ports (P1, P2, P3, P4) and a connection matrix having connection points (cp11, cp12, cp31). The cross-connection within the matrix indicated with c13 in FIG. 4 is a segment of connection c3 of FIG. 2; this segment internal to NE1 is required for connecting for example connection point cp12 of port P1 to connection point cp13 of port P3 crossing the two domains. In this case the solution can be to demand to the control system of the network element the responsibility of the management of the shared resource for providing the segment c13 of connection c3. Referring to FIGS. 4 and 5, ports P1 and P2 (and the correspondent connection points) are controlled by Manager A, while ports P3 and P4 (and the correspondent connection points) by Manager B. The matrix is logically divided into two sub-matrixes A and B, as shown in FIG. 5: the first one is controlled by Manager A and the second by Manager B. Two virtual ports, VP1 and VP3, are created respectively for port P1 and P3 and a logical link Ic3 connects the two virtual ports. The first virtual port VP1 is connected to sub-matrix A and is controlled by Manager A, while the second virtual port VP3 is connected to sub-matrix B and is controlled by Manager B. When c13 is required, input cp12 from port P1 of the first sub-matrix must be connected to output cp13 of port P3 of the second sub-matrix, crossing Idc3. Manager A controls the connection Ic12 from input cp12 on port P1 to logical output Icp11 on port VP1 of the first sub-matrix, Manager B controls the connection Ic33 from logical input Icp31 on port VP3 to output cp13 on port P3 of the second sub-matrix and the connection from output Icp11 of the first sub-matrix on port VP1 to input Icp31 of the second sub-matrix on port VP3 is already provisioned by the control system of the network elememt NE1 using Ic13. In this solution some resources (VP1, Ic13, VP3) are used to carry connections crossing the two domains and can't be used for carrying connections in the same domain. The logical sub-matrix can have a physical correspondence to the connection matrix. For example, the connection matrix can be composed by a three-stage architecture: the first one is assigned to sub-matrix A controlled by Manager A, the third to sub-matrix B controlled by Manager B and some resources of the second stage are controlled by the local control system of the network element for performing the virtual ports and the logical links. Since the control system of a network element is local to the network element, it has not a global view of the network: this solution has the disadvantage not to find the best configuration of the connections in the network or of segment connections within the matrix and sometimes this solution can't even fit the network requirements. Moreover this solution adds an unnecessary complexity to the network element and reduces network element performance. Finally it has impact on implementation of the network element and the introduction of the Control Plane requires a change also of network elements, i.e. of TPEs.

Each Manager controls both the configuration of the logical sub-matrix of the correspondent domain and other management functionalities related to the connections of the controlled domain.

SUMMARY OF THE INVENTION

In view of the drawbacks and deficiencies of the known solutions, as described above, the main object of the present invention is to provide a method for controlling a shared resource for the configuration of segments of connections between different network domains crossing the shared resource. The basic idea is that multiple Managers control the shared resource and cooperate in order to control the shared resource dinamically. Advantages of this solution are that the Managers have a global view of the correspondent network domain and can manage the shared resource in an optimized way, depending on network requirements. Moreover the solution does not impact implementation of the network element; consequently it does not reduce network element performance and the introduction of the Control Plane for migration from traditional to ASON networks does not require to change Transport Plane Elements.

A correlated advantage is that the shared resource can be used also for providing connections in the same domain.

Another correlated advantage is that the method can be used not only for configuration of connections between different domains but also for configuration of other management functionalities related to the connections between different domains, like for example:

provisioning parameters and/or
fault management parameters and/or
performance monitoring parameters.

BRIEF DESCRIPTION OF THE DRAWINGS

FIG. 6 shows a first preferred embodiment of a network element including a shared resource managed according to the invention.

FIG. 7 shows a second preferred embodiment of a network element including a shared resource managed according to the invention.

FIG. 8 shows a first preferred embodiment of two network elements of two different network domains and including shared resources managed according to the invention.

BEST MODE FOR CARRYING OUT THE INVENTION

FIG. 6 shows a first preferred embodiment for network element NE1 including a shared connection matrix controlled by both Managers for configuration of a cross-connection within the matrix by connecting different connection points: some connection points are controlled by Manager A, other connection points are controlled by Manager B and some shared connection points are controlled by both Managers.

Figure 5:
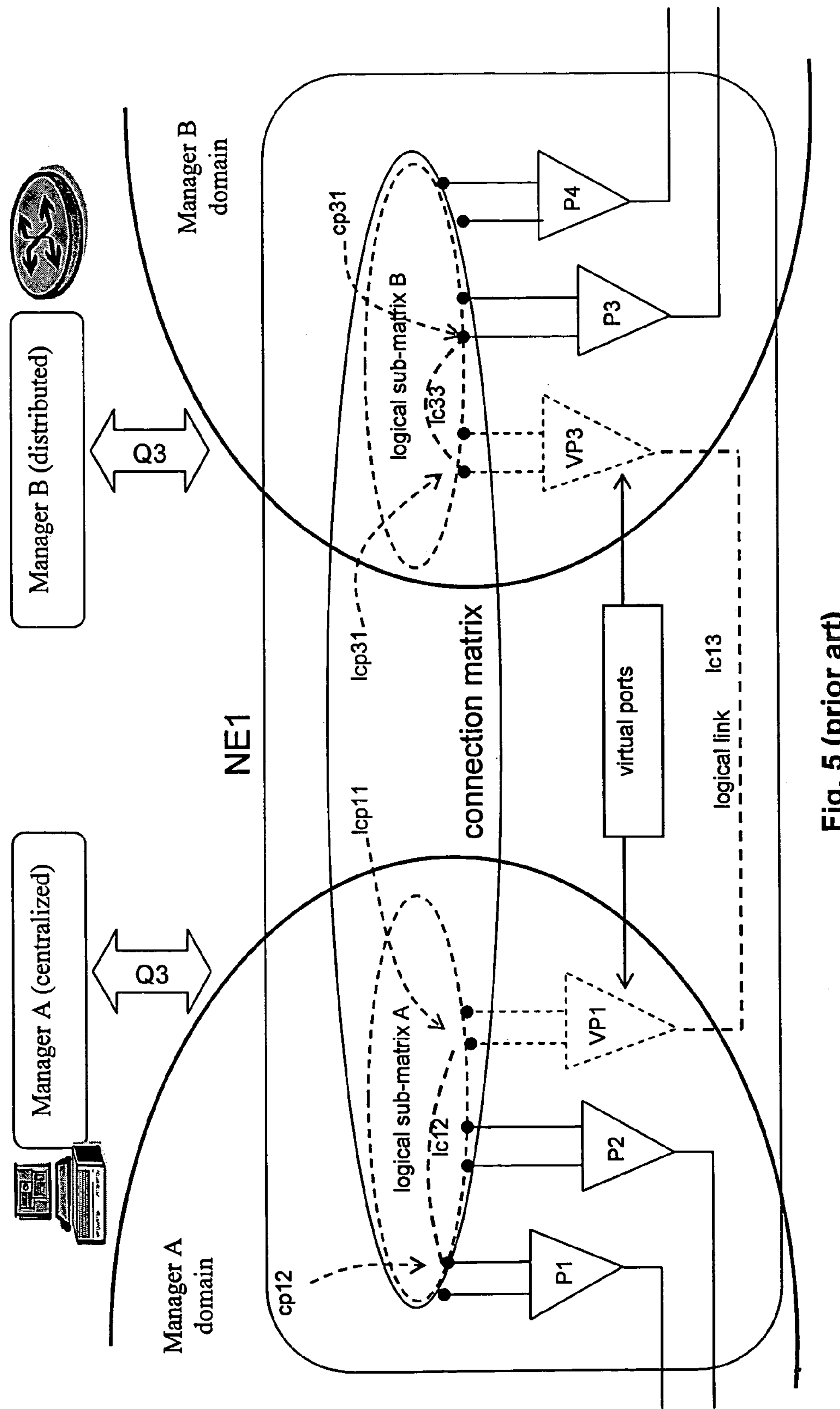
FIG. 5 shows a network element including a shared resource managed according to prior art.

NE1 includes 4 ports: port P1 (and the correspondent connection points) is controlled by Manager A, port P4 (and the correspondent connection points) is controlled by Manager B, while two ports (indicated with SP2 and SP3 for differentiating from ports P2 and P3 of FIG. 5) don't belong only to one Manager but can be controlled by both Managers (this is also indicated by the arrow from Manager A to SP3 and from Manager B to SP2). Connection points of ports SP2 and SP3 can be controlled independently by the two Managers, i.e. at the same time one cp (for example cp31) can be controlled by Manager A and another cp also of the same port (for example cp32) can be controlled by Manager B. The cooperation between the two Managers is required for avoiding blocking situations, i.e. situations wherein the two Managers require the use of the same connection point at the same time. Connections are performed according to some rules. For segment c13 between connection point cp12 on port P1 controlled by Manager A and connection point cp31 on port SP3, connection point cp31 is controlled by Manager A. The same rule is used for a segment (not shown in FIG. 6) from a connection point on port P4 controlled by Manager B and a connection point on port SP2, i.e. connection point on port SP2 is controlled by Manager B. A segment of a connection between the two domains can be performed also from connection points of ports SP2 and SP3; in this case one Manager controls the two connection points of the two ports according to a rule. For example the two connection points can be controlled by the Manager requesting the connection between the two domains or different levels of priority can be assigned to the two Managers and the two connection points are controlled by the Manager having the highest priority.

Ports SP2 and SP3 can be used not only for carrying segments of connections between different domains, but also for carrying segments of connections in the same domain, according to the same rules defined above. FIG. 5 shows a further segment c34 between connection point cp32 of the same port SP3 and connection point cp41 of port P4 controlled by Manager B, which also controls the connection point cp41. In this case port SP3 carries at the same time both a segment c13 of a connection between different domains and a segment c34 of a connection in the same domain.

The cooperation between the two Managers is performed dinamically, depending on network evolution, i.e. new connections can be set up when required and released if not required anymore. The same Manager, which has previously set up a connection, is also responsible for the release of the same connection; for example Manager A is also responsible for the release of the segment c13 previously set up. After releasing of the segment, connection point cp31 on port SP3 is again available for carrying another segment of a connection between the two domains or in Manager B domain crossing port SP3: in this case both Managers A and B can request another connection and the control of the shared resource is continuously performed according to the rules defined above. A connection point used one Manager only if it is available, i.e. not used by other Managers. If Manager A is controlling connection point cp32 of port SP3 for configuration of segment c13 and also Manager B requires the use of connection point cp32 for configuration of another segment crossing connection point cp32, Manager B has to wait that Manager A releases segment c13 and only after the release Manager B can use connection point cp32 for configuration of another segment.

In FIG. 6 the shared matrix includes some connection points controlled by one Manager and some connection points controlled by both Managers, but it is also possible that all connection points of the matrix are controlled by both Managers. Still referring to FIG. 6, all connection points of ports SP2 and SP3 are controlled by both Managers, but it is also possible that some connection points of one port are controlled by both Managers and other connection points of the same port are controlled by one Manager. For example in SP3, cp31 is controlled by both Managers and cp32 is controlled by Manager B: in this case cp32 can be used by Manager B for provisioning of segments of connections in Manager B domain (like c34).

Figure 1:
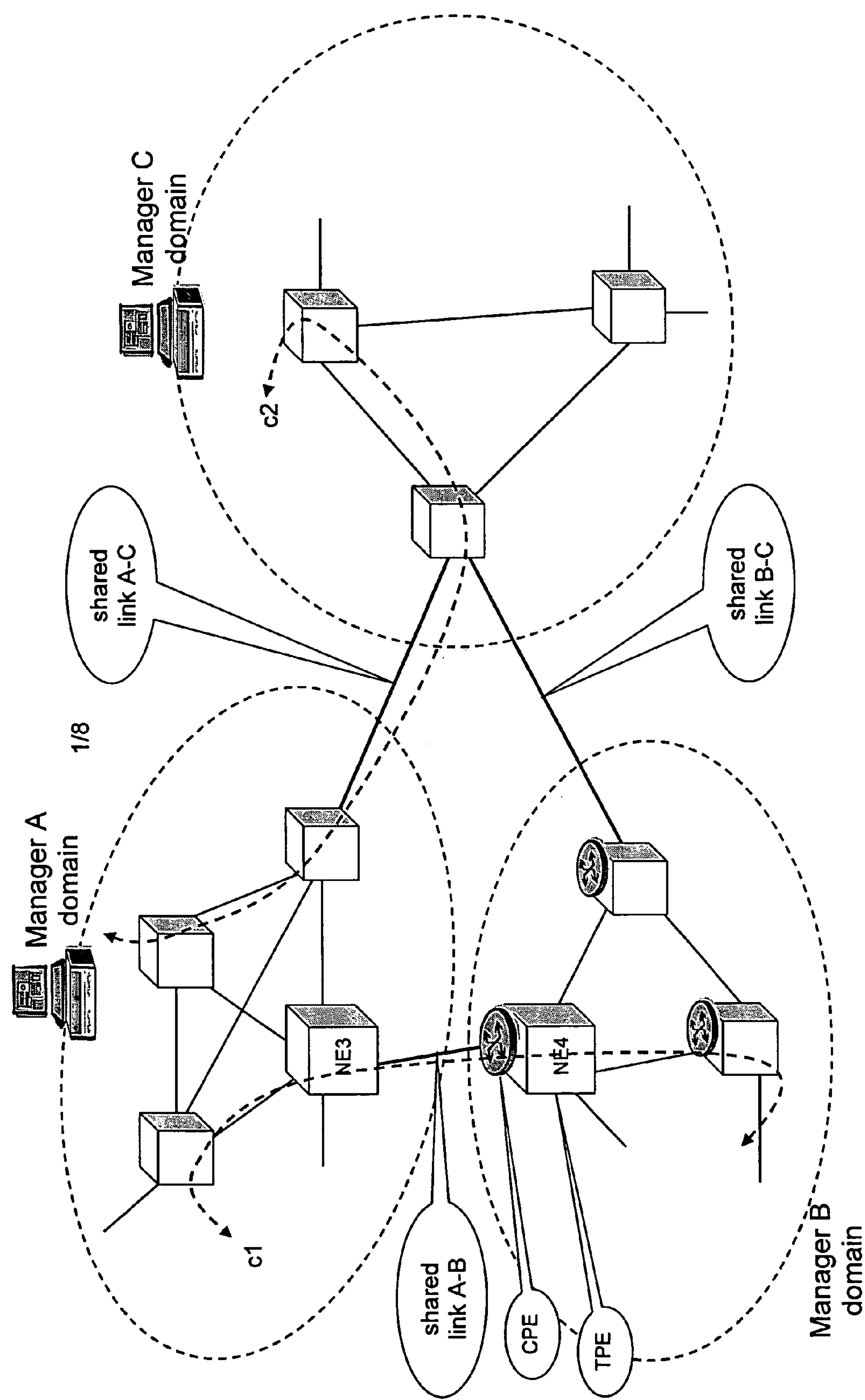
FIG. 1 shows a multi-Manager telecommunication network including shared links between different domains.
Figure 2:
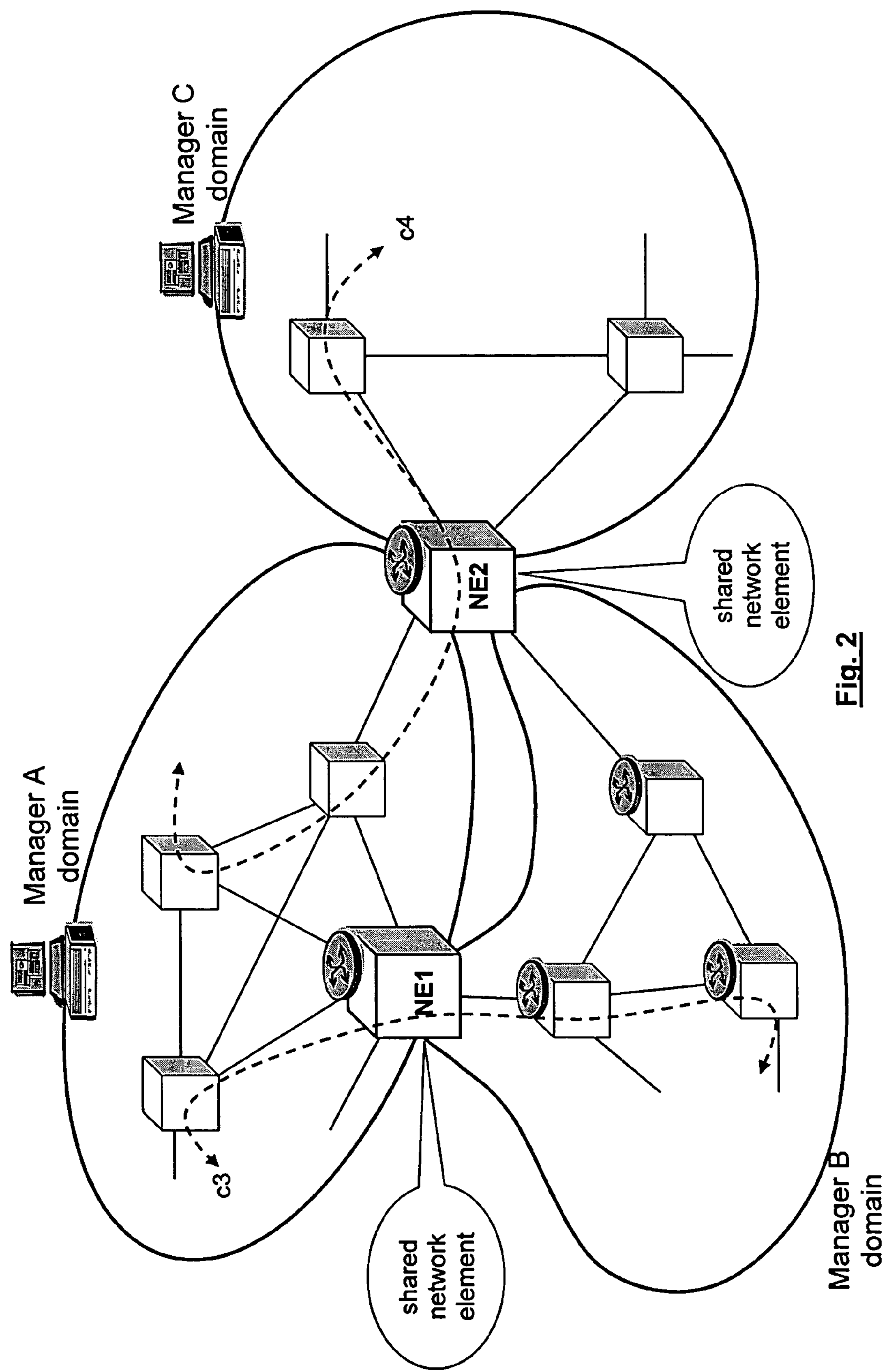
FIG. 2 shows a multi-Manager telecommunication network including network elements between different domains and including shared resources.
Figure 3:
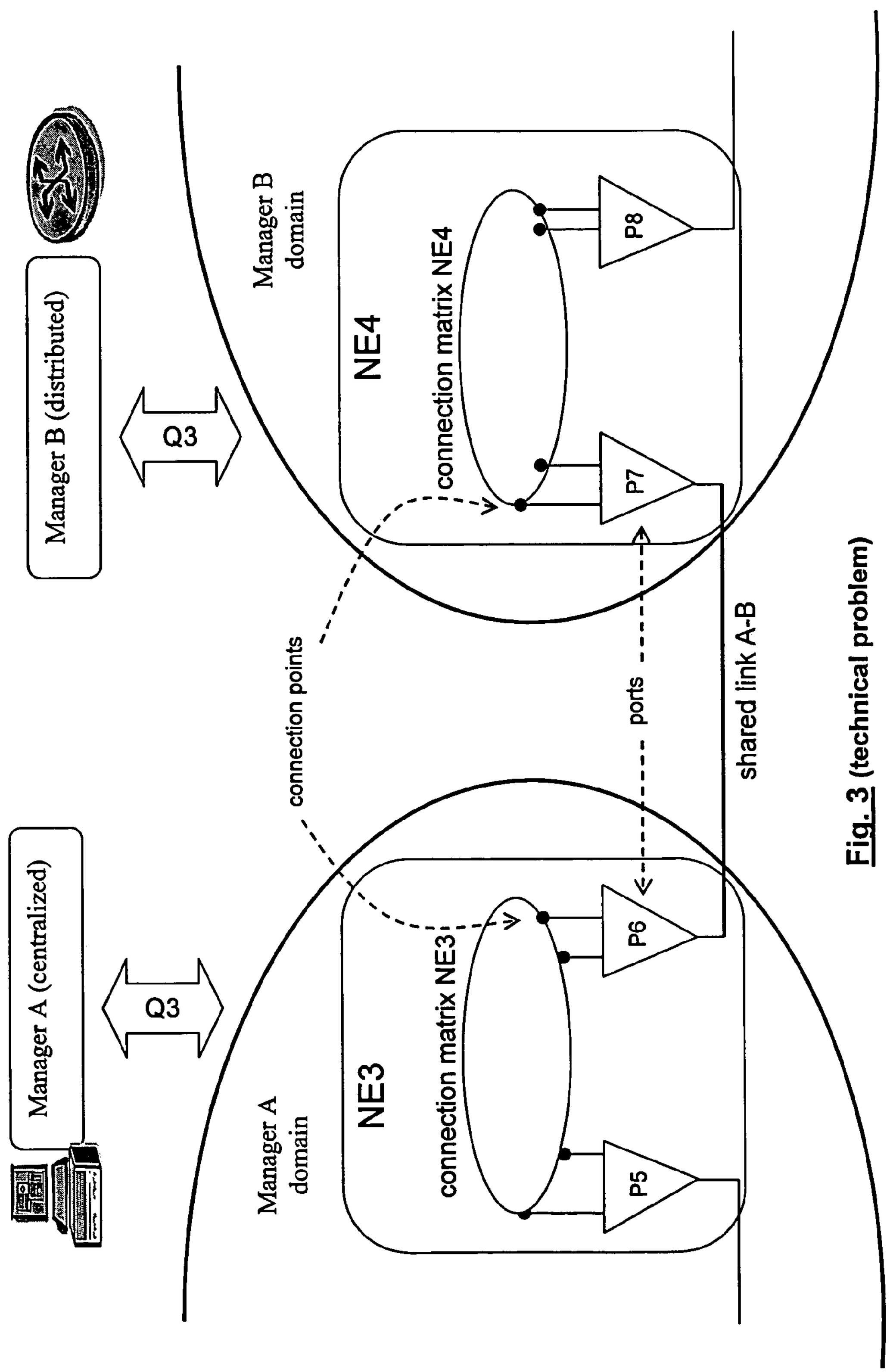
FIG. 3 shows more in detail two network elements of two different network domains and including shared resources.
Figure 4:
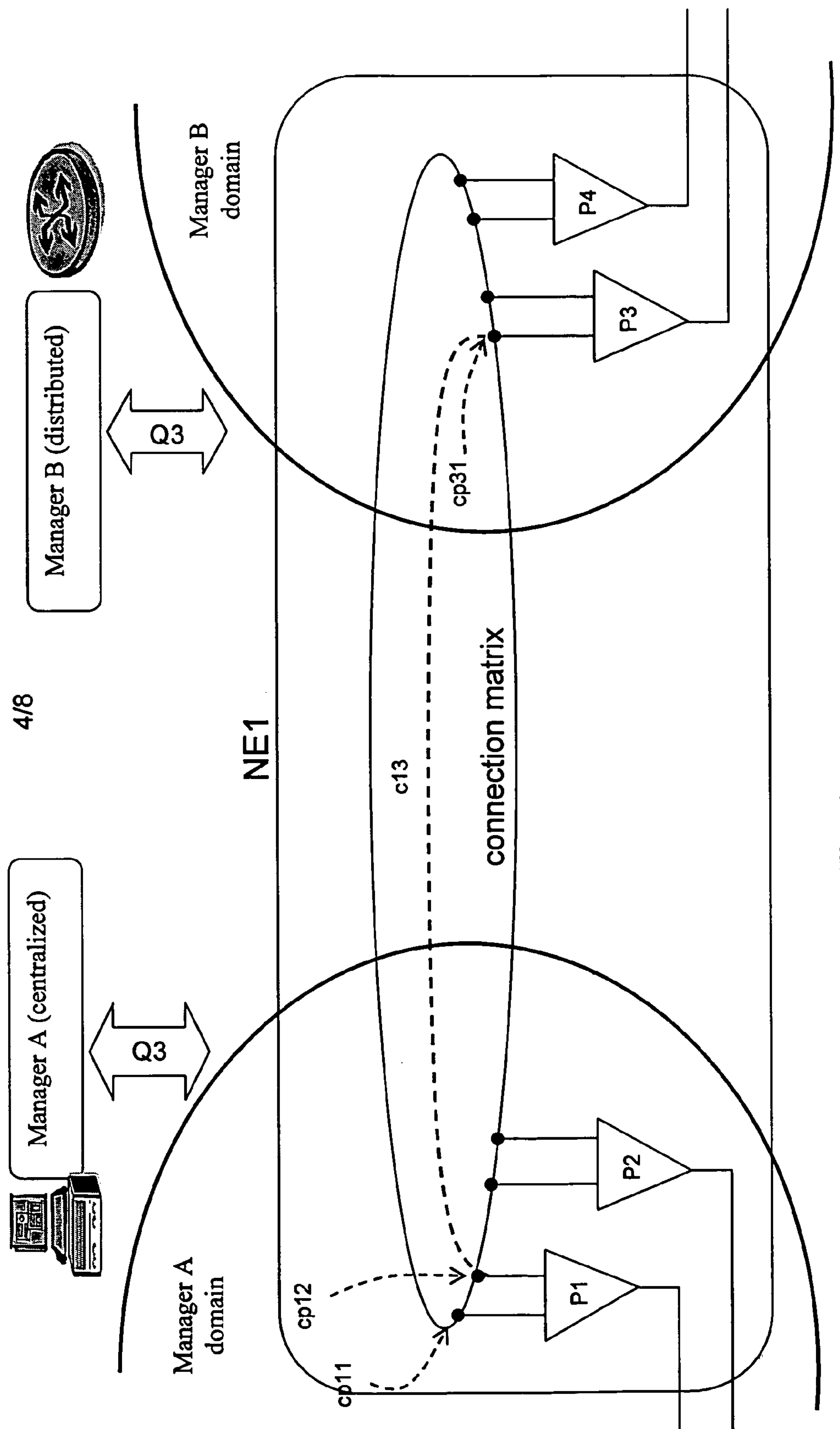
FIG. 4 shows more in detail a network element including a shared resource.

In the first preferred embodiment the matrix is shared between a centralized Manager (A) and a distributed Manager (B), but the same method can be used between two centralized Managers, like Manager A and C for NE2 of FIG. 2, or between two distributed Managers. Moreover, FIG. 6 shows a matrix shared between two Managers, but the same method can be used for a matrix shared by more than two Managers, like Managers A, B and C for NE2 of FIG. 2.

The cooperation between multiple Managers can be performed using information stored into a MIB. Each Manager stores into a local MIB the information required for the management of the controlled domain, like the number of network elements, the list of connections in the controlled domain, the configuration of each network element. The centralized Manager stores the local MIB into the management station and the distributed Manager into the CPE. Moreover each network element (or each TPE for the ASON architecture) includes one MIB for storing information of the network element, like the configuration of the matrix and the list of the cross-connections within the matrix, provisioning parameters, fault and performance parameters. Information required for performing the inventive method can be stored into MIB of the network element: each Manager can access this common MIB so that each Manager can detect if the shared resource is available or if it is already used by another Manager.

The Managers controls the shared matrix for configuration of cross-connections between different connection points of the matrix according to an explicit or implicit mode. In the explicit mode MIB of the network element stores the status of the shared resource for indicating for each segment if the resource is free or reserved for carrying the segment. If the shared resource is the matrix of a network element between two network domains, the MIB includes the list of cp controlled by Manager A, the list of cp controlled by Manager B and the list of shared cp controlled by both Managers; moreover MIB includes one (or more) variable for each shared cp having a free value for indicating that the cp is free, i.e. available for a cross-connection, and a reserved value for indicating that the cp is reserved, i.e used by Manager A or Manager B for a cross-connection. The status of the shared matrix is free for carrying the cross-connection if the shared cp is free, while the status is reserved if the shared cp is reserved. In the implicit mode MIB of the network element stores the list of the segments of the connections between the two domains and crossing the shared resource. Still referring to the shared matrix of a network element between two network domains, MIB includes the list of cp controlled by Manager A, the list of cp controlled by Manager B and the list of shared cp controlled by both Managers; moreover MIB includes the list of the cross-connections within the matrix, identified by the two connected cp. According to the defined modes, three scenarios are possible between two Managers, depending on the mode used by each Manager:

Managers A and B explicit;

Manager A and B implicit;

Manager A explicit and Manager B implicit (or viceversa).

Referring to FIG. 6, in the first scenario when Manager A requires shared cp31 for providing c13, it reads into MIB of network element NE1 the status of the matrix for cross-connection c13 (i.e. the value of the variable for cp31) and if it is free for carrying cross-connection c13 (i.e. if the variable for cp31 has the free value), Manager A writes the reserved status for cross-connection c13 (i.e. writes the reserved value into the variable for cp13) and finally Manager A controls the configuration of cross-connection c13 by transmitting to NE1 a command for indicating to connect cp12 with cp31. If Manager B requires to use cp31, it reads into MIB of NE1 the reserved status for cross-connection c13 (i.e. the reserved value of the variable for cp13) and detects that cp31 is already used and can't use cp31 until it becomes avaiable. When Manager A decides to release c13, it transmits a command to NE1 for indicating to disconnect cp12 from cp31 and then writes the free status for cross-connection c13 (i.e. writes the free value into the variable for cp31); at this time both Managers can use cp31 for configuration of a cross-connection by reading the free value of the variable for cp13. The same method is used by Manager B when cp31 is available and Manager B requires to use cp31 (for example for a cross-connection between cp31 and one connection point on port P4) or when the matrix is shared by more than two Managers (each Manager can use the above method). In the second scenario both Managers controls the shared matrix according to the implicit mode. When Manager A requires shared cp31 for providing c13, it reads into MIB of network element NE1 the list of the cross-connections actually used within the matrix (each one identified by the two connected cp) and it checks if cp31 is used by a cross-connection; if cp31 is not used, Manager A adds the cross-connection (and cp31) into the list and finally Manager A controls the configuration of cross-connection c13 by transmitting to NE1 a command for indicating to connect cp12 with cp31. If Manager B requires to use cp31, it reads into MIB of NE1 the list of the cross-connections actually used within the matrix and detects that cp31 is already used and can't use cp31 until it becomes available. When Manager A decides to release c13, it transmits a command to NE1 for indicating to disconnect cp12 from cp31 and then removes the cross-connection c13 (and cp31) from the list; at this time both Managers can use cp31 for configuration of a cross-connection by reading the list of the cross-connections. The same method is used by Manager B when cp31 is available and Manager B requires to use cp31 (for example for a cross-connection between cp31 and one connection point on port P4) or when the matrix is shared by more than two Managers (each Manager can use the above method). In the third scenario Manager A controls the shared matrix according to the explicit mode and Manager B controls the shared matrix according to the implicit mode; MIB of the network element stores both the status of shared connection points and the list of the segments. When Manager A requires cp31 for providing c13, it reads into MIB of network element NE1 the status of the matrix for cross-connection c13 (i.e. the value of the variable for cp31) and if it is free for carrying cross-connection c13 (i.e. if the variable for cp31 has the free value), Manager A writes the reserved status for cross-connection c13 (i.e. writes the reserved value into the variable for cp13) and adds the cross-connection cp13 (identified by cp31 and cp12) into the list and finally Manager A controls the configuration of cross-connection c13 by transmitting to NE1 a command for indicating to connect cp12 with cp31. If Manager B requires to use cp31, it reads into MIB of NE1 the list of the cross-connections actually used within the matrix and detects that cp31 is already used for cross-connection c13 and can't use cp31 until it becomes available. When Manager B requires cp31 for providing c13, it reads into MIB of NE1 the list of the cross-connections actually used within the matrix (each one identified by the two connected cp) and it checks if cp31 is used by a cross-connection; if cp31 is not used, Manager A adds the cross-connection (identified by cp31 and cp12) into the list and writes the reserved status for cross-connection c13 (i.e. writes the reserved value into the variable for cp13) and finally Manager A controls the configuration of cross-connection c13 by transmitting to NE1 a command for indicating to connect cp12 with cp31. If Manager A requires to use cp31, it reads into MIB of NE1 the reserved status for cross-connection c13 (i.e. the reserved value of the variable for cp13) and detects that cp31 is already used and can't use cp31 until it becomes avaiable.

The same method can be used in case of two network domains connected by a link, as shown in FIG. 8: the shared resource includes two connection matrixes (shared connection matrix NE3, shared connection matrix NE4) of two network elements (NE3, NE4) belonging to different network domains and a link connecting the two network elements. Network element NE3 in domain A includes a shared connection matrix (shared connection matrix NE3) having some connection points controlled by Manager A (cp of port P5) and other shared connection points controlled by both Managers (cp of port SP6). Network element NE4 in domain B includes a shared connection matrix (shared connection matrix NE4) having some connection points controlled by Manager B (cp of port P8) and other shared connection points controlled by both Managers (cp of port SP7). A segment of a connection between the two domains is comprised between one cp of port SP6 and one cp of port SP7. The cooperation between Managers A and B is performed using information stored into MIB of NE3 (or alternatevely into MIB of NE4): both Managers can read and write this information in order to control shared cp of shared ports SP6 and SP7.

In a second preferred embodiment, shown in FIG. 7, the cooperation between multiple Managers can be achieved alternatively by exchanging messages directly between the multiple Managers, according to a defined signalling protocol, without using MIB stored into the TPE. The messages can be carried in the network over channels available for carrying control data, like DCC in SDH, or in control data packets in the same channels used for carrying user data packets. The method can be implemented between two Managers of two different network domains by extending for example the RSVP-TE or the CR-LDP protocols. Each Manager control the access the shared resource sending a first message to other Manager requesting if the status of the shared resource is free or reserved for carrying the segment of the connection and other Manager answers to the request with a second message indicating the free or reserved status.

Multiple Managers cooperate not only for controlling the configuration of connections, but also for other management functionalities related to the connections and involving different network domains, for example configuration of:

- provisioning parameters;
- fault management parameters;
- performance monitoring parameters;
- correlation of fault or performance parameters values for generating alarms.

According to the invention, each Manager controls not only the configuration of parameters of connection points of the correspondent domain, but also parameters of connection points controlled by both Managers. For example, in FIG. 6 Manager A, which has provided segment c13 between cp12 and cp31, can also control the configuration of performance monitoring parameters both on cp12 and on cp31, by setting for example the same threshold on cp12 and on cp31. As an example of configuration of provisioning parameters, byte J0

(Trace Identifier) in RSOH of SDH technology can be shared by two Managers; Manager A can assign a first value to this byte, but also Manager B can partially update this byte, reading the first value and writing a second value according to the first value previously assigned by Manager A. For fault monitoring, some parameters are required for controlling the quality of a connection; for example a degrade alarm is generated when the bit error rate is greater than a defined threshold or when the number of consecutive errors is greater than a defined value or when the number of errors is greater than a defined value in a defined time unit. Some of these parameters can be shared and controlled by Manager A, but also Manager B can read the value previously assigned by Manager A and use these values, for example for correlating the values in order to understand if the quality required for a connection is fulfilled.

The method can be advantageously implemented in a telecommunication network including at least two network domains and at least one network element, for example an Add-Drop Multiplexer (ADM), a Digital Cross Connect, an Optical Cross Connect, a switch or a router. The network element includes hardware devices like an Application Specific Integrated Circuit (ASIC), a Field Programmable Gate Array (FPGA) and/or processing means, like a microprocessor (external or embedded into an ASIC or FPGA). The network element includes the shared resource for interconnecting the two network domains controlled by different Managers, storing means (for example a RAM) to store the management information base including the status of the shared resource for indicating if the resource is free or reserved for carrying a segment of a connection between the two domains crossing the shared resource, receiving means adapted to receive from both Managers at different time a first message indicating to read the status of the shared resource for the segment, a second message indicating to write the status and a third message for controlling the shared resource for the configuration of the segment, transmitting means adapted to transmit to the Managers a fourth message indicating the status of the shared resource, processing means elaborating the first message from the receiving means, reading the status from the management information base and sending the fourth message to the transmitting means, elaborating the second message from the receiving means and writing into the management information base, and elaborating the third message from the receiving means and performing the configuration of the at least one segment. Referring to FIG. 6, the shared resource includes a connection matrix (indicated with shared connection matrix) to interconnect the two network domains. The connection matrix has connection points for performing cross-connections within the matrix by connecting different connection points and has first connection points controlled exclusively by Manager A, second connection points controlled exclusively by Manager B and third shared connection points controlled by both Managers; the segment is a cross-connection between a shared connection point and a different shared connection point or a cross-connection between a shared connection point and a connection point controlled by one of the Managers. Referring to FIG. 8, the shared resource includes a connection matrix (indicated with shared connection matrix NE3) having connection points for performing cross-connections within the matrix by connecting different connection points and having connection points controlled exclusively by Manager A and shared connection points controlled by both Managers, shared ports (indicated with SP6) for connecting shared connection points to a link (indicated with shared link A-B) interconnecting the two domains; the segment is comprised between a shared connection point and one point of the link.

The method can be advantageously implemented with the help of a software program performing network management functions, or by one or more software module, using a programming language like C, C++ or Java. The management software program controls a network element; the network element includes a shared resource interconnecting two network domains controlled by different Managers and includes a management information base storing the status of the shared resource for indicating if the resource is free or reserved for carrying a segment of a connection between the two domains crossing the shared resource. The program includes at least one software module for transmitting to the network element a first message indicating to read the status of the shared resource for the segment and for receiving from the network element a fourth message indicating the status of the shared resource and, if equal to free, transmitting a second message for writing the reserved status and transmitting a third message for controlling the shared resource for the configuration of the segment.

The method can be advantageously implemented in Network management system including two (or more) Managers controlling different network domains and including a shared resource interconnecting the two network domains; both Managers of the two domains control the shared resource for the configuration of a segment of a connection between the two domains crossing the shared resource and the Managers cooperate in order to control dynamically the shared resource. Referring to FIG. 6, the shared resource includes a connection matrix (indicated with 'shared connection matrix') of a network element between the two network domains. The connection matrix has connection points for performing cross-connections within the matrix by connecting different connection points and has first connection points controlled exclusively by one of the Managers, second connection points controlled exclusively by the other Manager and third shared connection points controlled by both Managers; the segment is a cross-connection between a shared connection point and a different shared connection point or a cross-connection between a shared connection point and a connection point controlled by one of the Managers. Referring to FIG. 8, the shared resource includes two connection matrixes (indicated with 'shared connection matrix NE3' and 'shared connection matrix NE4') of two network elements (NE3, NE4) belonging to different network domains and connected through a link. The first connection matrix has connection points for performing cross-connections within the matrix by connecting different connection points and has connection points controlled exclusively by Manager A and shared connection points controlled by both Managers; the second connection matrix has connection points for performing cross-connections within the matrix by connecting different connection points and has connection points controlled exclusively by Manager B and shared connection points controlled by both Managers. Each network element includes shared ports for connecting shared connection points to the link. The segment is comprised between two shared connection points of the two different domains.

The invention claimed is:

1. A method for controlling a shared resource by different managers, the different managers controlling different network domains and cooperating to control dynamically the shared resource, the method comprising the steps of:

interconnecting the network domains through the shared resource, wherein the shared resource is at least a portion of at least one of an Add-Drop Multiplexer, a Digital Cross Connect or an Optical Cross Connect; and configuring in the shared resource at least one segment of a connection between the network domains and crossing the shared resource, the cooperation between the different managers controlling the configuration of the at least one segment, and wherein one of the different managers directly commands a configuration change of the shared resource for the configuration of the at least one segment of the connection within the domain controlled by another manager and crossing the shared resource.

2. The method of claim 1, wherein one of the different managers is a central manager and another is a distributed manager.

3. The method of claim 1, wherein a management information base stores a status of the shared resource for indicating for each segment if the shared resource is free or reserved for carrying the segment, each manager controlling the shared resource by reading the status and, if equal to free, writing the reserved status for the correspondent segment, configuring of the segment and writing the free status after the release of the segment.

4. The method of claim 1, wherein a management information base stores a list of the segments of actually used connections between the network domains and crossing the shared resource, each manager controlling the shared resource by reading the list and, if the list does not include the segment, adding the segment into the list, configuring the segment and removing the segment from the list after the release of the segment.

5. The method of claim 1, wherein a management information base stores a status of the shared resource for indicating for each segment if the resource is free or reserved for carrying the segment and stores a list of segments of actually used connections between the two domains and crossing the shared resource, a first manager controlling the shared resource by reading the status and, if equal to free, writing the reserved status for the correspondent segment, adding the segment into the list, controlling the configuration of the segment, writing the free status and removing the segment from the list after the release of the segment; and a second manager controlling the shared resource by reading the list and, if the list does not include the segment, adding the segment into the list, writing the reserved status for the correspondent segment, configuring the segment, removing the segment from the list and writing the free status after the release of the segment.

6. The method of claim 1, wherein the shared resource includes a connection matrix of a network element between the two network domains, the connection matrix having connection points for performing cross-connections within the connection matrix by connecting different connection points and having first connection points controlled exclusively by one of the managers, second connection points controlled exclusively by another manager and third shared connection points controlled by the different managers, the at least one segment being a cross-connection between a shared connection point and a different shared connection point or a cross-connection between a shared connection point and a connection point controlled by one of the managers.

7. The method of claim 1, wherein the shared resource includes two connection matrixes of two network elements belonging to the different network domains and connected through a link, the first connection matrix having connection points for performing cross-connections within the connection matrix by connecting different connection points and having connection points controlled exclusively by one of the different managers and shared connection points controlled by the different managers, the second connection matrix having connection points for performing cross-connections within the connection matrix by connecting different connection points and having connection points controlled exclusively by another manager and shared connection points controlled by the different managers, each network element including shared ports for connecting shared connection points to the link, the at least one segment being comprised between two shared connection points of the two different network domains.

8. The method of claim 1, wherein the different managers control the access to the shared resource by transmitting messages carried in the network between the different managers according to CR-LDP signalling protocol, each manager sending a first message to other managers for requesting if a status of the resource is free or reserved for carrying the segment and the other managers answering with a second message indicating the free or reserved status.

9. The method of claim 1, wherein the different managers control the shared resource for the configuration of:

provisioning parameters and/or fault management parameters and/or performance monitoring parameters for the at least one segment of the connection.

10. A network element including:

a shared resource interconnecting different network domains being controlled by different managers, the shared resource including at least one segment of a connection between the domains and crossing the shared resource, wherein the shared resource is at least a portion of at least one of an Add-Drop Multiplexer, a Digital Cross Connect or an Optical Cross Connect;

wherein one of the different managers directly commands a configuration change of the shared resource for the configuration of the at least one segment of the connection within the domain controlled by another manager and crossing the shared resource, storing means adapted to store a management information base including a status of the shared resource for indicating if the resource is free or reserved for carrying the at least one segment;

receiving means adapted to receive from the different managers at different times a first message indicating to read the status of the shared resource for the segment, a second message indicating to write the status and a third message indicating the configuration in the shared resource of the at least one segment;

transmitting means adapted to transmit to the different managers a fourth message indicating the status of the shared resource; and processing means elaborating the first message from the receiving means, reading the status from the management information base and sending the fourth message to the transmitting means, elaborating the second message from the receiving means and writing into the management information base, and elaborating the third message from the receiving means and configuring in the shared resource the at least one segment.

11. The network element of claim 10, wherein the shared resource includes a connection matrix to interconnect the two network domains, the connection matrix having connection points for performing cross-connections within the matrix by connecting different connection points and having first connection points controlled exclusively by one of the different managers, second connection points controlled exclusively by another manager and third shared connection points controlled by the different managers, the at least one segment being a cross-connection between a shared connection point and a different shared connection point or a cross-connection between a shared connection point and a connection point controlled by one of the managers.

12. The network element of claim 10, wherein the shared resource includes:

a connection matrix having connection points for performing cross-connections within the connection matrix by connecting different connection points and having connection points controlled exclusively by the manager of the first domain and shared connection points controlled by the different managers; and shared ports for connecting shared connection points to a link interconnecting the two domains;

the at least one segment being comprised between a shared connection point and one point of the link.

13. A network management system configured to control a network element, the network element including a shared resource interconnecting different network domains controlled by different managers and including a management information base storing a status of the shared resource for indicating if the resource is free or reserved for carrying at least one segment of a connection between the network domains and crossing the shared resource, the network management system being configured to perform steps, comprising:

transmitting to the network element a first message indicating to read the status of the shared resource for the at least one segment; and receiving from the network element a fourth message indicating the status of the shared resource and, if equal to free, transmitting a second message for writing the reserved status and transmitting a third message for configuring in the shared resource the at least one segment;

wherein the shared resource is at least a portion of at least one of an Add-Drop Multiplexer, a Digital Cross Connect or an Optical Cross Connect, and wherein one of the different managers directly commands a configuration change of the shared resource for the configuration of the at least one segment of the connection within the domain controlled by another manager and crossing the shared resource.

14. A network management system including two different managers controlling different network domains and including a shared resource interconnecting the network domains, wherein the different managers configure in the shared resource at least one segment of a connection between the network domains and crossing the shared resource, and wherein the different managers cooperate to control dynamically the configuration of the at least one segment in the shared resource, and wherein the shared resource is at least a portion of at least one of an Add-Drop Multiplexer, a Digital Cross Connect or an Optical Cross Connect, and wherein one of the different managers directly commands a configuration change of the shared resource for the configuration of the at least one segment of the connection within the domain controlled by another manager and crossing the shared resource.

15. The network management system of claim 14, wherein the shared resource includes a connection matrix of a network element between the two network domains, the connection matrix having connection points for performing cross-connections within the connection matrix by connecting different connection points and having first connection points controlled exclusively by one of the different managers, second connection points controlled exclusively by the other manager and third shared connection points controlled by both managers, the at least one segment being a cross-connection between a shared connection point and a different shared connection point or a cross-connection between a shared connection point and a connection point controlled by one of the different managers.

16. The network management system of claim 14, wherein the shared resource includes two connection matrixes of two network elements belonging to different network domains and connected through a link, the first connection matrix having connection points for performing cross-connections within the connection matrix by connecting different connection points and having connection points controlled exclusively by one of the managers and shared connection points controlled by both managers, the second connection matrix having connection points for performing cross-connections within the matrix by connecting different connection points and having connection points controlled exclusively by the other manager and shared connection points controlled by both managers, each network element including shared ports for connecting shared connection points to the link, the at least one segment being comprised between two shared connection points of the two different network domains.

17. The management component of claim 13, wherein software for the management component is written in a JAVA programming language.

18. The method of claim 4, wherein the management information base stores a number and a configuration of network elements in a controlled domain and a list of connections in the controlled domain.

19. The method of claim 8, wherein the different managers control the access to the shared resource by transmitting the messages carried in the network between the different managers according to RSVP-TE or the CR-LDP signalling protocol.

* * * * *